United States Patent
Sakamoto

(10) Patent No.: US 7,854,486 B2
(45) Date of Patent: Dec. 21, 2010

(54) CONTAINER EQUIPPED ON VEHICLE

(75) Inventor: Junichi Sakamoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 244 days.

(21) Appl. No.: 11/978,727

(22) Filed: Oct. 30, 2007

(65) Prior Publication Data
US 2008/0157554 A1   Jul. 3, 2008

(30) Foreign Application Priority Data
Dec. 27, 2006   (JP) ............................ 2006-351738

(51) Int. Cl.
*A47B 88/16* (2006.01)
(52) U.S. Cl. .................................. 312/333; 312/330.1
(58) Field of Classification Search ............. 312/330.1, 312/334.1, 334.7, 319.1, 245, 246, 333, 334.44, 312/334.46; 131/231, 241, 242; 296/24.34, 296/37.1, 37.8, 37.9
See application file for complete search history.

(56) References Cited

U.S. PATENT DOCUMENTS

| | | | | |
|---|---|---|---|---|
| 2,695,831 A | * | 11/1954 | Sigal | 312/246 |
| 3,539,239 A | * | 11/1970 | Mallonn | 312/307 |
| 4,494,806 A | * | 1/1985 | Williams et al. | 312/333 |
| 4,596,427 A | * | 6/1986 | Pflugfelder | 312/319.1 |
| 4,712,845 A | * | 12/1987 | Nicol | 312/222 |
| 5,144,963 A | * | 9/1992 | Dabringhaus et al. | 131/231 |
| 5,393,137 A | * | 2/1995 | Bivens et al. | 312/332 |
| 5,887,596 A | | 3/1999 | Ziegler et al. | |
| 6,796,591 B2 | * | 9/2004 | Yanagita | 296/37.8 |

FOREIGN PATENT DOCUMENTS

| | | |
|---|---|---|
| JP | 1-159281 A | 6/1989 |
| JP | 2005-205966 A | 8/2005 |

\* cited by examiner

*Primary Examiner*—James O Hansen
(74) *Attorney, Agent, or Firm*—Birch, Stewart, Kolasch & Birch, LLP

(57) ABSTRACT

A container includes a drawer that can be held at an intermediately open position and can be easily moved to the fully open position. A container includes a drawer for accommodating a small article, an accommodation case for accommodating the drawer for horizontal sliding movement, and an intermediately open stopping mechanism for stopping the drawer at an intermediate position once when the drawer is pulled out toward the passenger side. The intermediately open stopping mechanism includes an arm member provided on the drawer and having a pin-like projection at a tip end thereof, and a groove group provided and extending on the accommodation case for guiding the pin-like projection. The groove group includes a plurality of guide grooves including a blind alley portion for stopping the pin-like projection at the intermediately open position once.

18 Claims, 12 Drawing Sheets

INTERMEDIATELY OPEN POSITION

FULLY OPEN POSITION

US 7,854,486 B2

CONTAINER EQUIPPED ON VEHICLE

CROSS-REFERENCE TO RELATED APPLICATIONS

This nonprovisional application claims priority under 35 U.S.C. §119(a) on Patent Application No. 2006-351738, filed in Japan on Dec. 27, 2006, the entirety of which is incorporated herein by reference.

BACKGROUND OF THE INVENTION

1. Field of the Invention

The present invention relates to improvements in or relating to a container equipped on a vehicle.

2. Background of the Invention

A container equipped on a vehicle and including a drawer for accommodating a small article, an accommodation case for accommodating the drawer for sliding movement and an intermediately open stopping mechanism for stopping the drawer once at an intermediate position when the drawer is pulled out to the passenger side is known (refer to, for example, Japanese Patent Application Laid-Open No. 2005-205966 (FIGS. 11 and 18)).

In FIG. 11 of Japanese Patent Application Laid-Open No. 2005-205966, an inner cover 157 (for reference characters, those of the document are applied) covers a head pipe from the rear and forms part of a vehicle body cover 34. A housing wall 197 is provided at an opening portion of the inner cover 157 and a drawer is provided for horizontal sliding movement on the inner side of the housing wall 197. The inner cover 157, housing wall 197 and the drawer are provided at a front portion of a vehicle.

In FIG. 18 of Japanese Patent Application Laid-Open No. 2005-205966, a holding mechanism 230 (hereinafter referred to as "intermediately open stopping mechanism 230") for holding the drawer at an intermediate position (intermediately open position) is provided between the inner cover and the drawer.

In order to cancel the holding state at the intermediately open position, the driver would operate a pivot engaging member 235 to pivot in a direction indicated by an arrow mark in the figure to cancel the engagement of an engaging recessed portion 238 with a lock shaft 232. Once the engagement is canceled, since the drawer is biased toward the opening side, the drawer is opened to the opening side.

Incidentally, the pivot engaging member 235 is provided below the drawer. In order for the driver to move the drawer to the fully open position, the driver must reach out its hand below the drawer and operate the pivot engaging member 235. This complicates the operation. Furthermore, when the pivot engaging member 235 is operated, depending upon the physical features of the driver, stooping action is required. This further complicates the operation.

It is preferable if a technique is available by which operation for moving a drawer, which has a function of holding the drawer at an intermediately open position between the fully closed position and the fully open position, from the intermediately open position to the fully open position, can be performed readily.

SUMMARY OF THE INVENTION

It is a subject of the present invention to provide a container wherein operation of moving a drawer having a function of holding the drawer at an intermediately open position from the intermediately open position to the fully open position can be performed readily.

According to a first aspect of the present invention, a container equipped on a vehicle and including a drawer for accommodating a small article, an accommodation case for accommodating the drawer for sliding movement and an intermediately open stopping mechanism for stopping the drawer once at an intermediate position when the drawer is pulled out to the passenger side, is characterized in that the container comprises a resilient mechanism provided on the accommodation case for resiliently biasing the drawer at the fully closed position toward the opening side until the fully open position is reached, and a stopping cancel mechanism provided on the accommodation case for canceling the stopping by the intermediately open stopping mechanism when the drawer stopped at the intermediate position by the intermediately open stopping mechanism is operated in the closing direction, and that the drawer stops at the fully open position after the drawer is operated in the closing direction and the stopping by the intermediately open stopping mechanism is canceled.

According to a second aspect of the present invention, the container equipped on a vehicle is characterized in that the intermediately open stopping mechanism includes an arm member provided for horizontal pivotal motion on the drawer or the accommodation case and having a pin-like projection at a tip end thereof, and a groove group extending in the sliding direction of the drawer on the accommodation case or the drawer for guiding the pin-like projection, that the groove group includes a first guide groove for guiding the pin-like projection from the fully open position to the fully closed position of the drawer, a second guide groove extending substantially linearly from a start point thereof at the fully closed position separately from the first guide groove for guiding the pin-like projection from the fully closed position to the intermediate position of the drawer, a blind alley portion provided at an end portion of the second guide groove for stopping the pin-like projection at the intermediate position once, and a communicating groove extending in an inclined relationship from the blind alley portion to the fully closed position side and intersecting with a mid portion of the first guide groove, and that, when the drawer is opened, as the pin-like projection advances along the second guide groove extending linearly, the pin-like projection is stopped once at the blind alley portion, and then, as the drawer is returned a little, the pin-like projection advances along the communicating path and enters the first guide groove, whereafter, as the drawer is pulled out, the pin-like projection advances along the first guide groove and comes to the fully open position, but when the drawer is closed, as the pin-like projection advances along the first guide groove, the pin-like projection moves from the fully open position to the fully closed position.

According to a third aspect of the present invention, the container equipped on a vehicle is characterized in that a non-return mechanism for allowing passage of the pin-like projection from the fully closed position to the intermediately open position along the second guide groove but preventing the pin-like projection from returning to the fully closed position is provided at an entrance of the blind alley portion.

According to a fourth aspect of the present invention, the container equipped on a vehicle is characterized in that the blind alley portion is formed in a V-shape as viewed in plan and a portion surrounded by the first guide groove, second guide groove and communicating groove is formed as a triangular portion, and the blind alley portion is defined such that the bottom of the V-shape of the blind alley portion is positioned rather near to the first guide groove with respect to the vertex of the triangular portion which faces the blind alley portion.

According to fifth aspect of the present invention, the container equipped on a vehicle is characterized in that the groove group is provided on the accommodation case while the arm member is provided on the drawer.

According to sixth aspect of the present invention, the container equipped on a vehicle is characterized in that an end portion of the second guide groove or an end portion of the first guide groove has an open end which extends to and is open at an end portion of the accommodation case, and the open end is formed in a shape of a spread fan.

In the first aspect of the present invention, the resilient mechanism for resiliently biasing the drawer at the fully closed position toward the opening side until the fully open position is reached and the stopping cancel mechanism for canceling the stopping by the intermediately open stopping mechanism when the drawer stopped at the intermediate position by the intermediately open stopping mechanism is operated in the closing direction are provided on the accommodation case.

The drawer is opened to the intermediately open position by the resilient mechanism and the intermediately open stopping mechanism, and then by operating the drawer stopping at the intermediate open position in the closing direction, the drawer is released by the stopping cancel mechanism and can be opened to the fully open position. In other words, the driver can move the drawer from the intermediately open position to the fully open position only by performing operation of pushing the drawer.

Accordingly, the driver can perform the operation of opening the drawer at the intermediately open position to the fully open position very readily.

In the second aspect of the present invention, the intermediately open stopping mechanism includes the arm member provided on one of the drawer and the accommodation case and having the pin-like projection, and the groove group disposed on the other of the accommodation case and the drawer for guiding the pin-like projection. Furthermore, the groove group includes the first guide groove, second guide, blind alley portion provided at the end portion of the second guide groove, and communicating groove extending in an inclined relationship from the blind alley portion and intersecting with the first guide groove.

When the drawer is opened, as the pin-like projection is stopped once at the blind alley portion, the drawer can be pulled out to the intermediately open position. Then, as the drawer is returned a little, the pin-like projection advances from the blind alley portion along the communicating path and enters the first guide groove. Then, as the drawer is pulled, the pin-like projection advances along the first guide groove and the drawer can be pulled out to the fully open position. In short, the driver can move the drawer from the intermediately open position to the fully open position only by pushing and pulling the drawer.

Accordingly, the driver can perform the operation of opening the drawer at the intermediately open position to the fully open position very readily. The drawer opening operation does not become cumbersome depending upon the physical features of the driver.

Furthermore, the structure for such operation of the drawer is formed simply from the pin-like projection and the guide grooves. Therefore, the number of parts can be minimized and the cost can be suppressed.

In the third aspect of the present invention, the non-return mechanism for allowing passage of the pin-like projection from the fully closed position to the intermediately open position along the second guide groove but preventing the pin-like projection from returning to the fully closed position is provided at the entrance of the blind alley portion. Therefore, when the pin-like projection comes to the blind alley portion, the pin-like projection does not return from the blind alley portion to the second guide groove.

Since the pin-like projection does not return to the second guide groove, the drawer can be opened from the intermediately open position to the fully open position with certainty.

In the fourth aspect of the present invention, the resilient mechanism for resiliently biasing the drawer to the opening side is provided on the drawer. Therefore, the pin-like projection abuts, at the intermediately open position, with the blind alley portion and is biased.

The blind alley portion is formed in a V-shape as viewed in plan and the portion surrounded by the first guide groove, second guide groove and communicating groove is formed as a triangular portion and the blind alley portion is defined such that the bottom of the V-shape of the blind alley portion is positioned rather near to the first guide groove with respect to the vertex of the triangular portion which faces the blind alley portion. Therefore, the pin-like projection entering the blind alley portion advances into the communicating groove when the drawer is returned a little.

Furthermore, the resilient mechanism for resiliently biasing the drawer to the opening side is provided on the drawer, and the blind alley portion is defined such that the bottom of the V-shape of the blind alley portion is positioned rather near to the first guide groove. By additionally providing the resilient mechanism and devising the arrangement of the blind alley portion in this manner, when the drawer is to be moved from the intermediately open position to the fully open position, since the pin-like projection can be advanced into the communicating path and then into the first guide groove, the drawer can be opened to the fully open position.

The blind alley portion is defined such that the bottom of the V-shape of the blind alley portion is positioned rather near to the first guide groove. Therefore, the pin-like projection can be advanced into the communicating path and then into the first guide groove without additionally providing a non-return mechanism at the entrance of the blind alley portion. Consequently, the drawer can be opened to the fully open position.

Since the necessity for a non-return mechanism is eliminated, the structure of the intermediately open stopping mechanism can be simplified.

In the fifth aspect of the present invention, the groove group is provided on the accommodation case. In other words, the groove group is not provided on the drawer side. Therefore, the accommodation capacity of the drawer is not decreased by the groove group, and a sufficient accommodation capacity can be assured.

When the drawer is removed, maintenance of the arm member provided on the drawer side can be carried out readily.

In the sixth aspect of the present invention, the end portion of the second guide groove or the end portion of the first guide groove has the open end which extends to and is open at the end portion of the accommodation case. Therefore, the arm member having the pin-like projection can be fitted into the groove group readily. Accordingly, the drawer can be assembled to the accommodation case readily.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
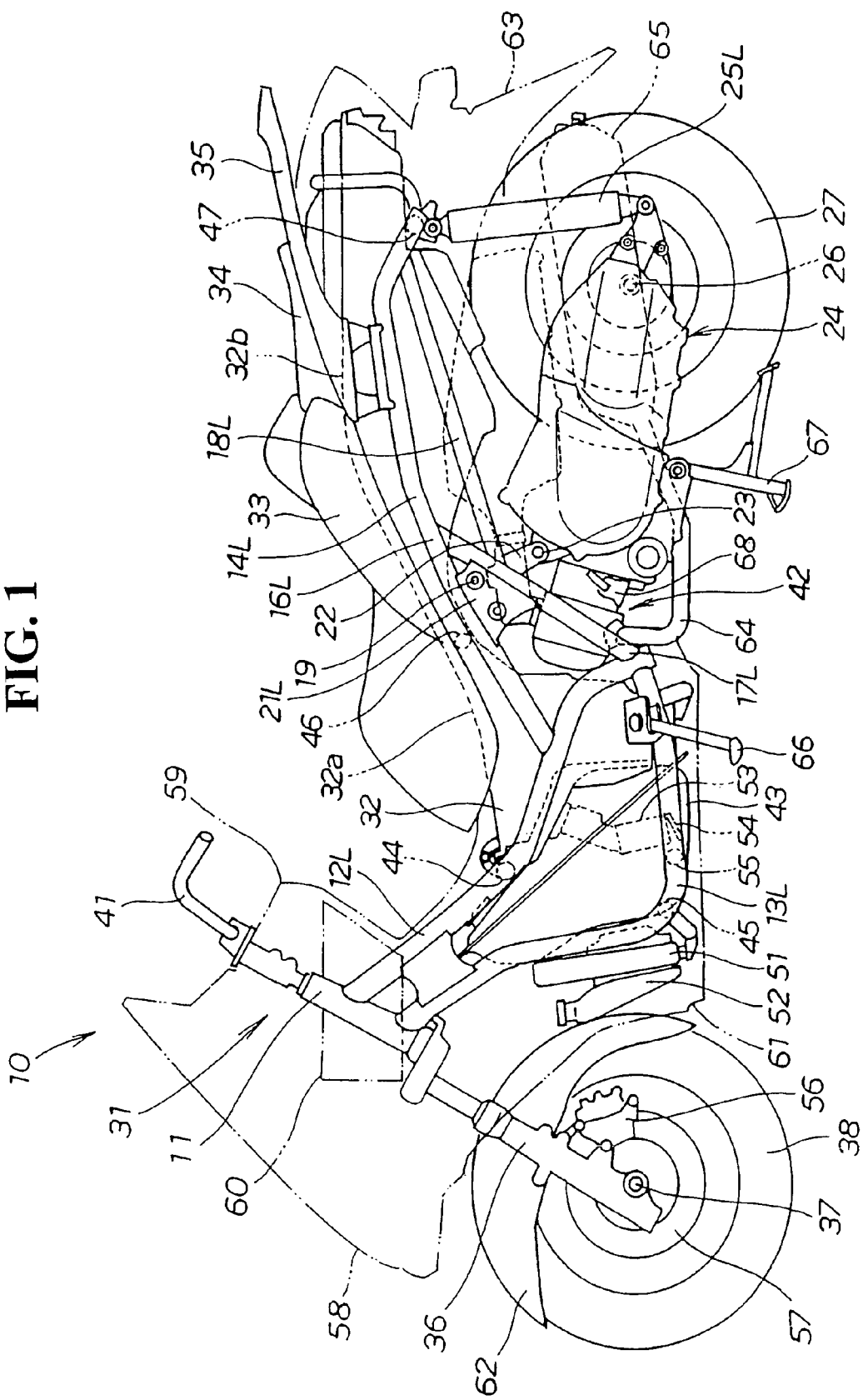
FIG. 1 is a left side elevational view of a motorcycle according to the present invention.

The present invention will now be described in detail with reference to the accompanying drawings, wherein the same reference numerals will be used to identify the same or similar elements throughout the several views. It should be noted that the drawings should be viewed in the direction of orientation of the reference numerals.

FIG. 1 is a left side elevational view of a motorcycle according to the present invention. The motorcycle 10 includes: main frames 12L, 12R (only reference character 12L on this side is shown) extending obliquely rearwardly downwards from an upper portion of a head pipe 11; down frames 13L, 13R (only reference character 13L on this side is shown) extending obliquely rearwardly downwards from a lower portion of the head pipe 11 and then substantially downwardly and finally rearwardly and connected to the main frames 12L, 12R; seat rails 14L, 14R (only reference character 14L on this side is shown) extending obliquely rearwardly upwards from rear portions of the main frames 12L, 12R; middle frames 17L, 17R (only reference character 17L on this side is shown) interconnecting intermediate points 16L, 16R (only reference character 16L on this side is shown) of the seat rails 14L, 14R and rear end portions of the main frames 12L, 12R; rail stays 18L, 18R (only reference character 18L on this side is shown) interconnecting upper portions of the middle frames 17L, 17R and rear portions of the seat rails 14L, 14R; pivot plates 21L, 21R (only reference character 21L on this side is shown) extending between the seat rails 14L, 14R and the middle frames 17L, 17R and supporting a pivot shaft 19; a link member 22 extending downwardly from the pivot plates 21L, 21R through the pivot shaft 19; a power unit 24 extending rearwardly through the link member 22 and a support shaft 23 and serving also as a rear swing arm which can swing upwardly and downwardly; a rear cushion unit 25L extending between a rear end portion of the power unit 24 and the seat rail 14L; a rear wheel axle 26 provided at a rear portion of the power unit 24 and serving as a driving shaft; a rear wheel 27 attached to the rear wheel axle 26; an accommodation box 32 attached to the seat rails 14L, 14R which are components of a vehicle body frame 31, a front seat 33 for covering a front portion 32a of the accommodation box 32 and being seated by the driver; a rear seat 34 for covering a rear portion 32b of the accommodation box 32 and being seated by a passenger; a rear spoiler 35 for covering the circumference of the rear seat 34; a front fork 36 attached for steering movement on the head pipe 11 at the front portion, a front wheel 38 attached to the front fork 36 through a front wheel axle 37; and a steering handle bar 41 attached to an upper end portion of the front fork 36. It is to be noted that the power unit 24 includes an engine 42.

Members extending between the left and right frames are described below.

A fuel tank 43 is disposed in a region surrounded by the main frames 12L, 12R and the down frames 13L, 13R, and a first cross member 44 extends between the left and right main frames 12L, 12R above the fuel tank 43. A second cross member 45 extends between the left and right down frames 13L, 13R below the fuel tank 43, and a third cross member 46 extends between the left and right seat rails 14L, 14R in the proximity of the pivot plates 21L, 21R. Further, a rear cross member 47 extends between rear end portions of the left and right seat rails 14L, 14R.

A radiator unit 51 for cooling the engine 42 is disposed forwardly of the down frames 13L, 13R rearwardly of the front wheel 38, and a coolant reservoir tank 52 is disposed in the proximity of the radiator unit 51.

It is to be noted that a fuel pump 53, a strainer 54 provided below the fuel pump 53 for separating foreign articles such as water or garbage in fuel accommodated in the fuel tank 43 and a flow sensor 55 for detecting the remaining amount of the fuel accommodated in the fuel tank 43 are provided in the inside of the fuel tank 43.

In the figure, reference numeral 56 identifies a front disk brake unit; 57 a front disk plate; 58 a front cowl which covers the front of the vehicle; 59 an inner cover which covers a front portion of the vehicle including the head pipe 11 and provided continuously to the front cowl 58; 60 a container equipped on the vehicle; 61a main cowl for covering side portions of the vehicle; 62 a front fender; 63 a rear fender; 64 an exhaust pipe extending from the power unit 24; 65 a silencer connecting to a rear end portion of the exhaust pipe 64; 66 a side stand; 67 a main stand; and 68 a secondary air reed valve disposed sidewardly of the engine and connected to the exhaust pipe 64 and an intake pipe 77 hereinafter described.

Figure 2:
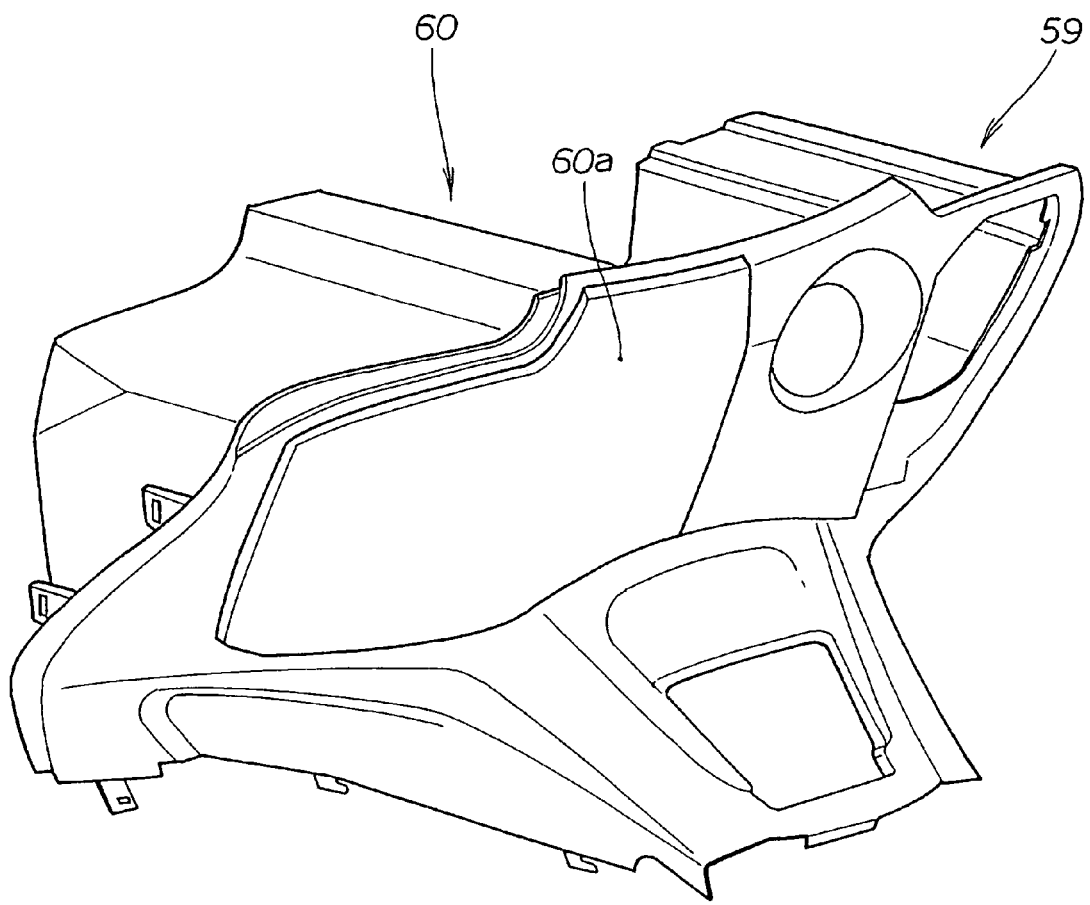
FIG. 2 is a perspective view of an inner cover which includes a container according to the present invention.

FIG. 2 is a perspective view of an inner cover which includes the container according to the present invention. The inner cover 59 is a member which is attached so as to extend forwardly from a rear of the front cowl (reference character 58 of FIG. 1) and is provided continuously to the front cowl 58. The inner cover 59 is opposed to a front portion of the front seat (reference numeral 33 of FIG. 1) on which the driver is to be seated, and is disposed at a position at which the hand of the driver reaches when the user in a seated state reaches out its hand.

The container 60 is provided on the inner cover 59, and the front face of the container 60 is covered with a lid 60a. Accordingly, the driver can reach out its hand operate to open and close the container 60 readily. The structure of the container 60 is described in detail below with reference to the succeeding figures.

Figure 3:
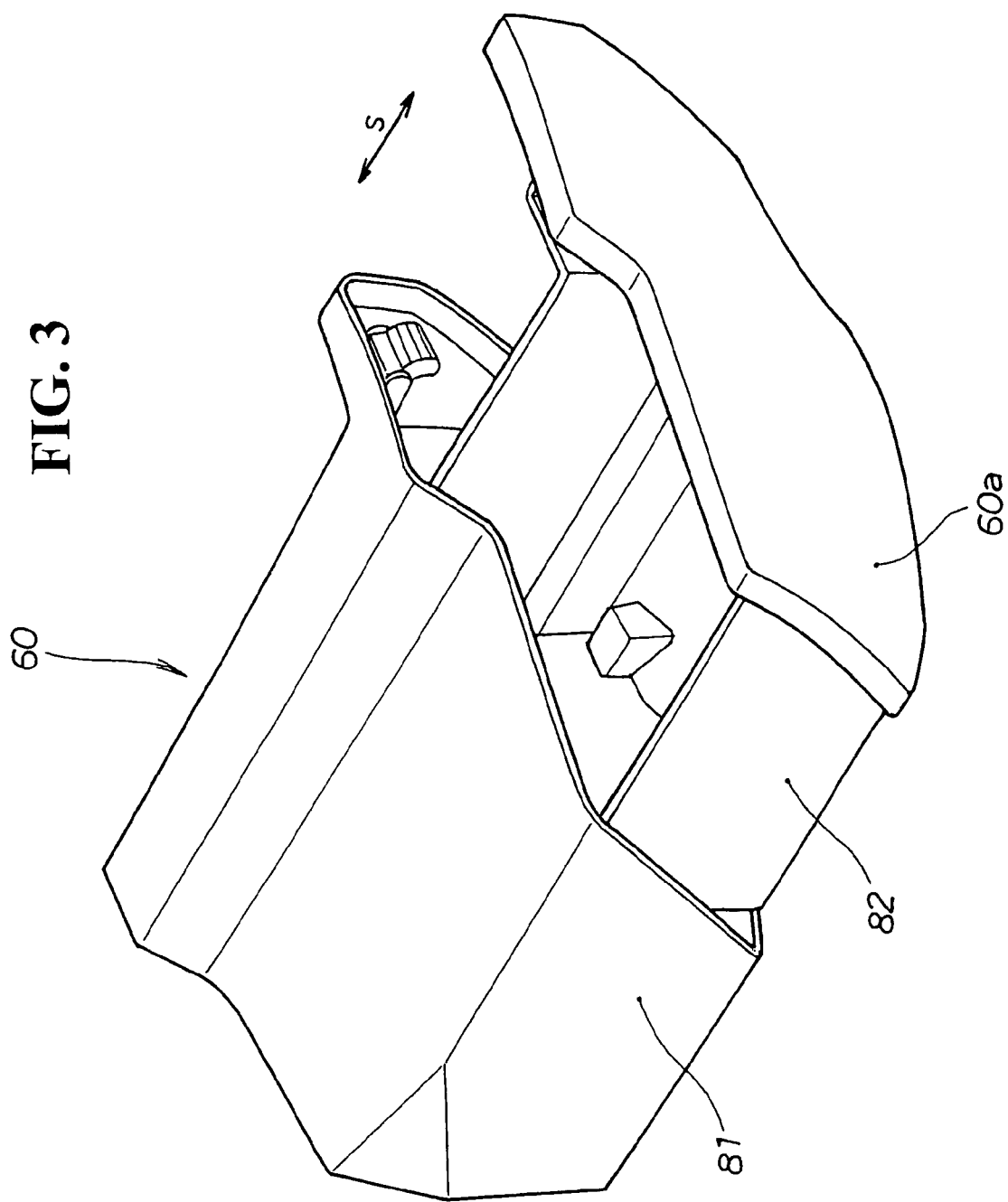
FIG. 3 is a perspective view illustrating a state wherein the container according to the present invention is at the fully open position.

FIG. 3 is a perspective view illustrating a state wherein the container according to the present invention is positioned at its fully open position, and the container 60 attached to the inner cover 59 is shown in a pulled out state.

The container 60 includes an accommodation case 81 attached to the inner cover (reference numeral 59 in FIG. 2), and a drawer 82 provided for horizontal sliding movement in the accommodation case 81. In the fully open state, the drawer 82 is prevented from coming off the accommodation case 81 by means of a stopper (not shown). If the stopper is rendered inoperative, then the drawer 82 can be removed readily from the accommodation case 81.

In other words, the container 60 includes a drawer 82 for accommodating a small article and an accommodation case 81 for accommodating the drawer 82 for horizontal sliding movement in directions indicated by an arrow mark s.

Figure 4:
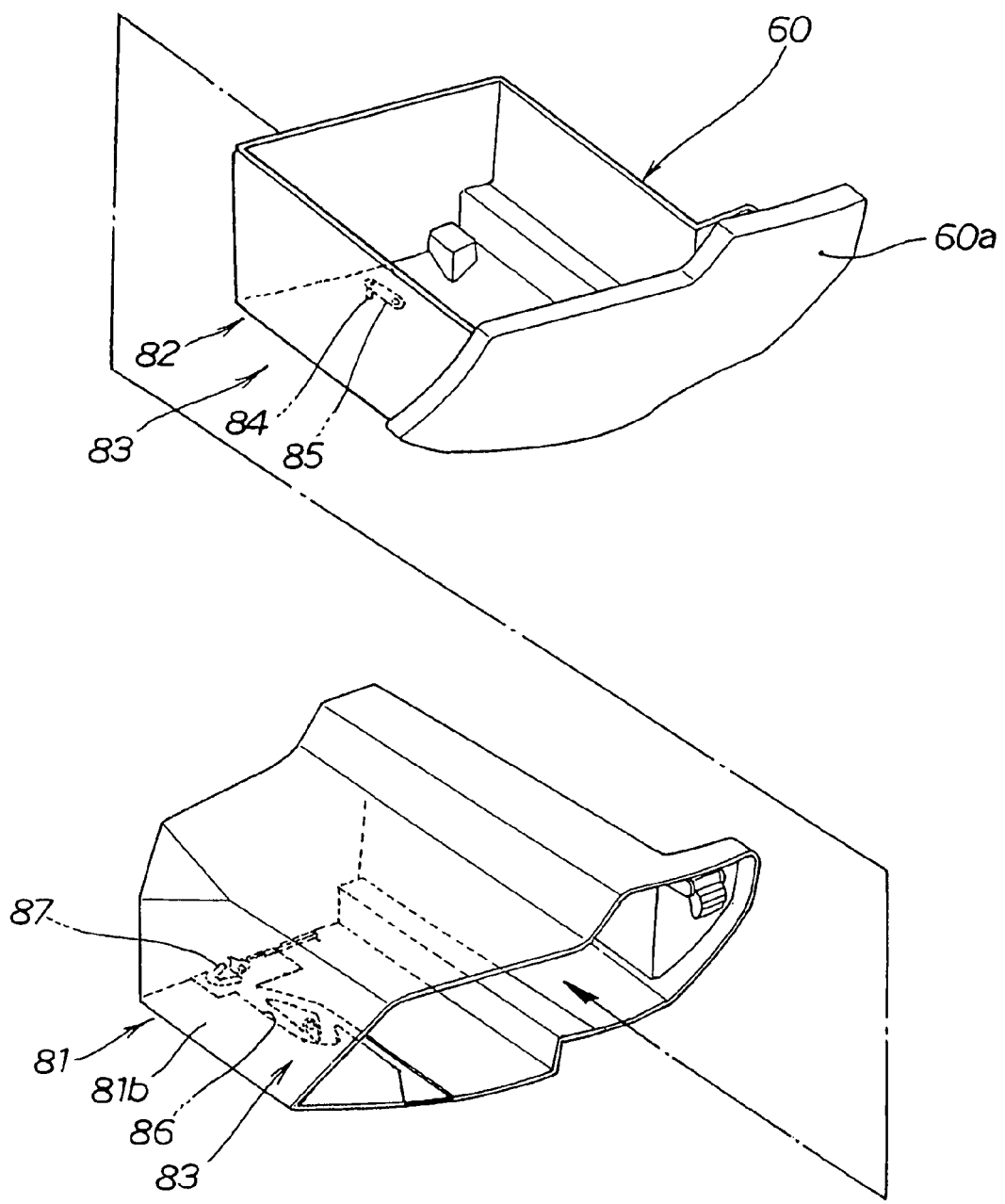
FIG. 4 is an exploded perspective view showing components of the container according to the present invention.

FIG. 4 is an exploded perspective view showing components of the container according to the present invention. As described hereinabove, the container 60 includes a drawer 82 and an accommodation case 81. An intermediately open stopping mechanism 83 for stopping the drawer 82 once at an intermediate position when the drawer 82 is pulled out toward the passenger side is provided on the drawer 82 and the accommodation case 81.

The intermediately open stopping mechanism 83 includes an arm member 85 provided on the drawer 82 and having a pin-like projection 84, and a groove group 86 including a plurality of grooves provided on a bottom plate 81b of the accommodation case 81 for guiding the pin-like projection 84.

The groove group 86 is provided on the accommodation case 81. In other words, the groove group 86 is not provided on the drawer 82 side. Therefore, the accommodation capacity of the drawer 82 does not decrease, and a sufficient accommodation capacity of the drawer 82 can be assured.

In addition, the arm member 85 is provided on the drawer 82 side. Therefore, maintenance of the arm member 85 can be performed readily by taking out the drawer 82.

It is to be noted that, while, in the present embodiment, the groove group 86 is provided on the accommodation case 81 and the arm member 85 is provided on the drawer 82, the groove group 86 may be provided on the drawer 82 and the arm member 85 may be provided on the accommodation case 81.

Figure 5:
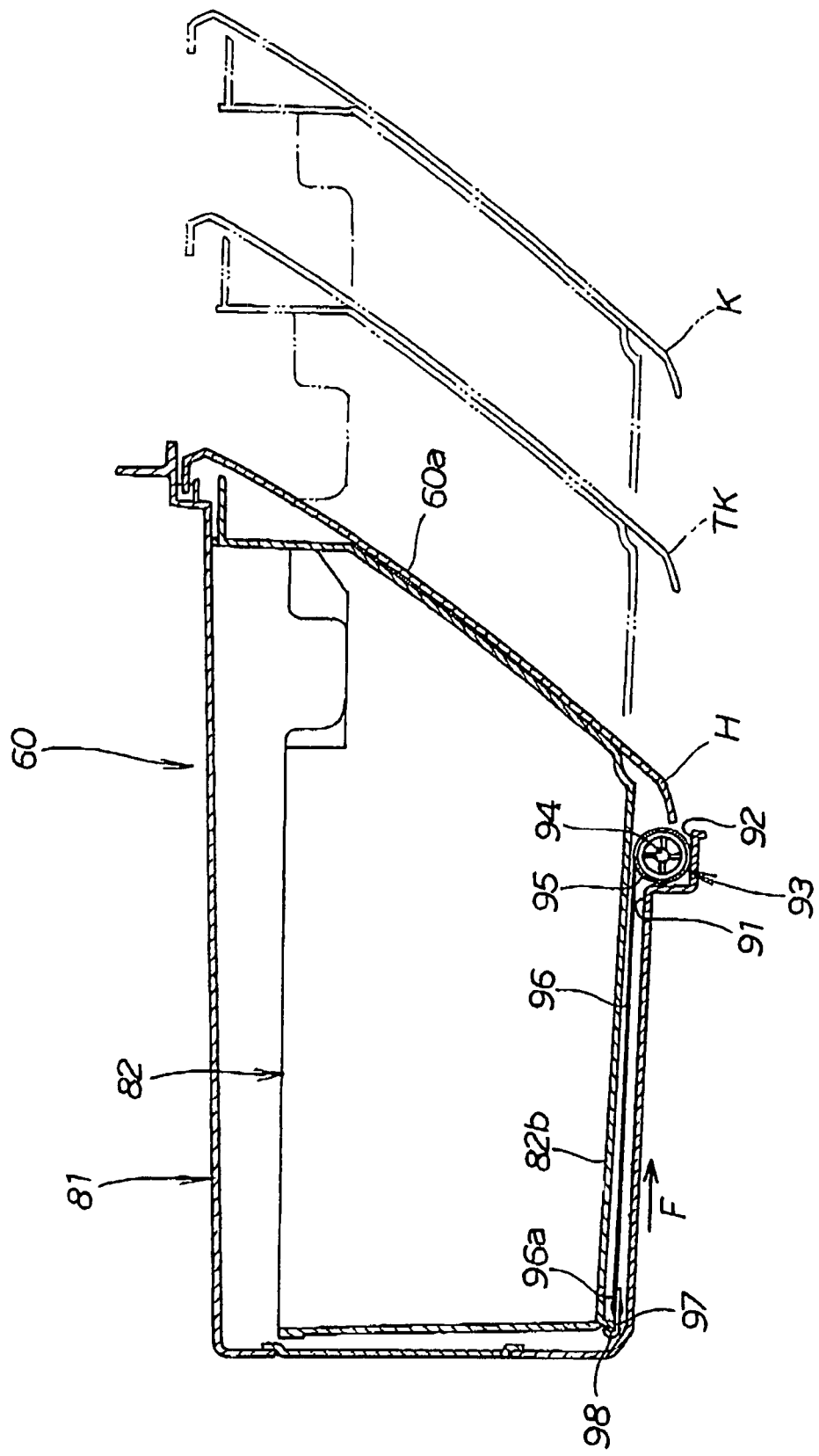
FIG. 5 is a sectional view showing a resilient mechanism for biasing a drawer in an opening direction according to the present invention.

FIG. 5 is a sectional view showing a resilient mechanism for biasing the drawer in the opening direction according to the present invention. The resilient mechanism 93 is attached to a small pocket 92 formed by partly expanding a portion of the accommodation case 81 in the proximity of an opening 91, which is an entrance of the accommodation case 81.

The resilient mechanism 93 includes a shaft portion 94 disposed on the small pocket 92 and attached to the accommodation case 81 side, a drum 95 attached for rotation on the shaft portion 94, a spiral spring 96 in the form of a thin plate wrapped around the drum 95, and a hook member 97 attached to an end portion 96a of the spiral spring 96.

The resilient mechanism 93 is configured such that the spiral spring 96 is wrapped around the drum 95 and, when this spiral spring 96 is extended, a force F for taking up the hook member 97 in a direction toward the drum 95 acts upon the hook member 97.

The hook member 97 is anchored at a hook anchoring portion 98 formed at an innermost portion of a bottom plate 82b of the drawer 82. The hook anchoring portion 98 is disposed such that it assumes a position most proximate to the resilient mechanism 93 when the drawer 82 is at its fully open position (K), but assumes another position spaced most away from the resilient mechanism 93 when the drawer 82 is at its fully closed position (H).

By anchoring the hook member 97 of the resilient mechanism 93 at the hook anchoring portion 98 of the drawer 82, the drawer 82 can be biased in a direction toward the fully open position (K).

Where the resilient mechanism 93 for resiliently biasing the drawer 82 at the fully closed position (H) toward the opening side is provided on the accommodation case 81, the drawer 82 tends to move to the fully open position (K). Therefore, a mechanism for holding the drawer 82 at the fully closed position (H) or an intermediately open position (TK) is required.

As the mechanism for holding the drawer 82 at the fully closed position (H) or the intermediately open position (TK), a locking mechanism for holding the drawer 82 at the fully closed position (H) and an intermediately open stopping mechanism for holding the drawer 82 at the intermediately open position (TK) are provided. Details of them are described below.

Figure 6:
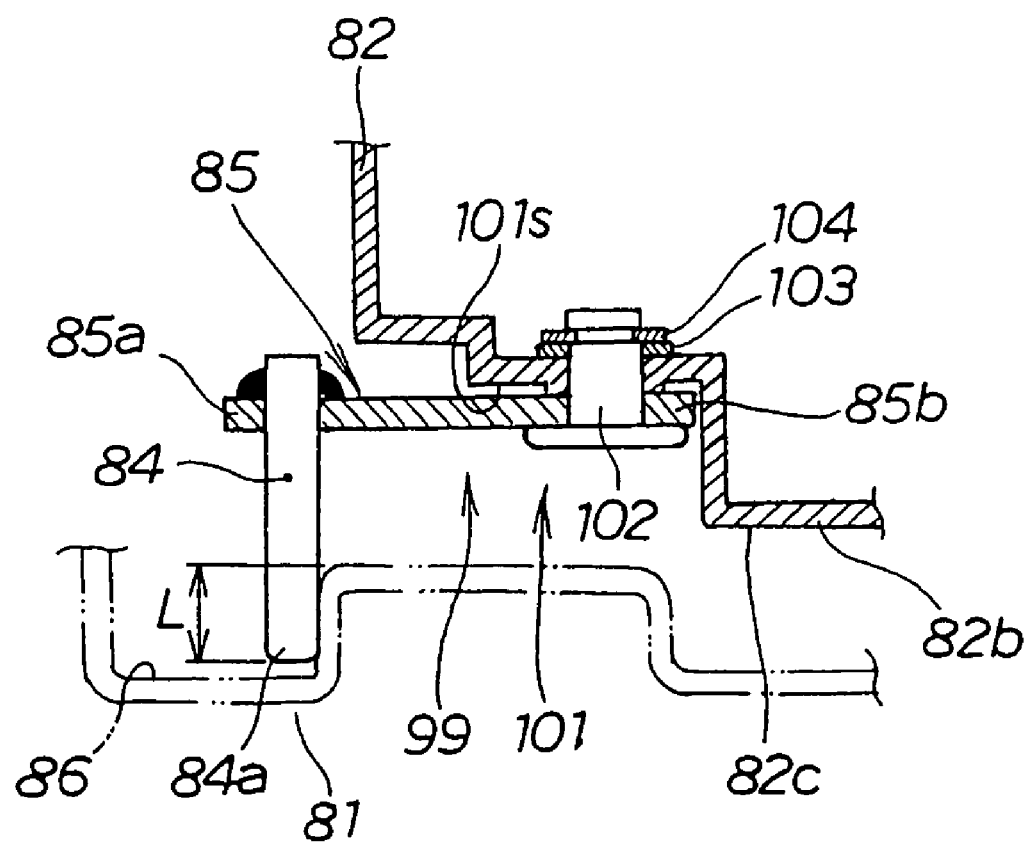
FIG. 6 is a sectional view showing an arm member having a pin-like projection at a tip end thereof according to the present invention.

FIG. 6 is a sectional view showing the arm member having the pin-like projection at the tip end thereof according to the present invention. A recessed portion 101 is provided at a rear end portion 99 of the bottom plate 82b of the drawer 82. The arm member 85 having the pin-like projection 84 at the tip end thereof is provided in the recessed portion 101.

The arm member 85 includes a support pin 102 attached at a right angle to a horizontal face 101s of the recessed portion 101. An arm member 85 is attached for pivotal motion in directions perpendicular to the plane of FIG. 6 around the support pin 102 and having a rear end 85b fitted on the support pin 102. The arm member 85 has the pin-like projection 84 provided at a tip end 85a thereof and projecting downwardly. An end portion 84a of the pin-like projection 84 extends downwardly farther than the bottom face 82c of the bottom plate 82b of the drawer 82 and has a margin for overlapping of a length L with the groove group 86. Furthermore, the support pin 102 and the arm member 85 are disposed such that they are accommodated in the recessed portion 101 above the bottom face 82c of the bottom plate 82b.

In other words, the arm member 85 is provided for horizontal pivotal motion as viewed in plan on the drawer 82 and the pin-like projection 84 is provided at the tip end 85a of the arm member 85. In FIG. 6, reference numeral 103 identifies a washer, and reference numeral 104 identifies a fixing ring for fixing the support pin 102. It is to be noted that the pin-like projection 84 is secured to the arm member 85 by welding.

Figure 7A:
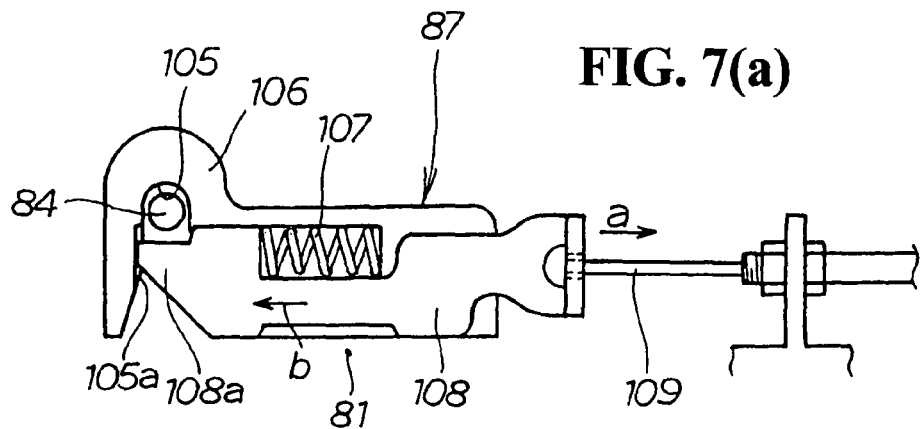
FIGS. 7(a), 7(b) and 7(c) are views showing a locking mechanism for the arm member having the pin-like projection at the tip end thereof according to the present invention and illustrating operation of the locking mechanism.
Figure 7B:
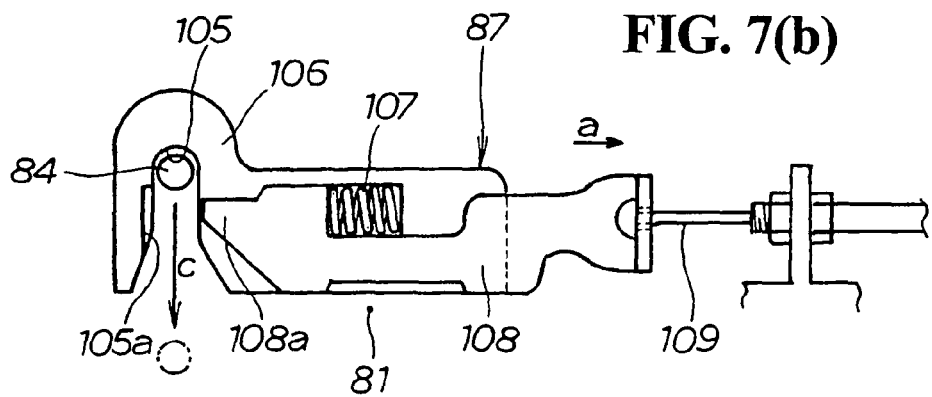
Figure 7C:
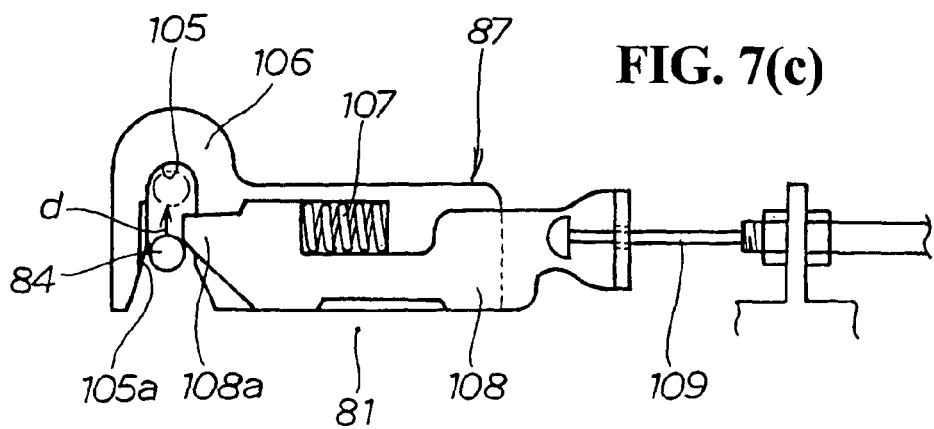

FIGS. 7(a), 7(b) and 7(c) are views showing the locking mechanism for the arm member having the pin-like projection at the tip end thereof according to the present invention and illustrating operation of the locking mechanism.

The drawer (reference numeral 82 in FIG. 5) is biased toward the opening side by the resilient mechanism (reference numeral 93 in FIG. 5). Therefore, in order to hold the drawer 82 at the fully open position, the locking mechanism 87 is provided on the accommodation case (reference numeral 81 in FIG. 5).

The locking mechanism 87 includes, as principal components thereof, a holder member 106 attached to the accommodation case 81 side and having a receiving portion 105 of a substantially U shape as viewed in plan for receiving the pin-like projection 84; a stopper 108 provided for sliding movement on the holder member 106 with a spring 107 interposed therebetween for holding or releasing the pin-like projection 84; and a cable 109 connected to the stopper 108 for pulling the stopper 108 in a direction indicated by an arrow mark a. The cable 109 is connected to an actuator (not shown). The spring 107 is a member for biasing the stopper 108 in a direction indicated by an arrow mark b in the figure.

In FIG. 7(a), the pin-like projection 84 is accommodated in the receiving portion 105 and the stopper 108 is biased by the spring 107. Therefore, an entrance 105a of the receiving portion 105 can normally be closed up with a tip end portion 108a of the stopper. When the pin-like projection 84 is held at the receiving portion 105, the drawer 82 is held at the fully closed position.

In FIG. 7(b), the cable 109 is pulled to move the stopper 108 in a direction indicated by an arrow mark a against the bias of the spring 107. Consequently, the tip end portion 108a of the stopper 108 does not close up the entrance 105a of the receiving portion 105, and the pin-like projection 84 can be released. The pin-like projection 84 is permitted to move in the direction indicated by an arrow mark c and can release the drawer 82 from the fully closed position.

In FIG. 7(c), when the drawer (reference numeral 82 in FIG. 5) is closed, the drawer 82 moves in the closing direction, and the pin-like projection 84 attached to the bottom plate of the drawer 82 abuts with the tip end portion 108a of the stopper 108 to move the stopper 108 in the direction indicated by an arrow mark d against the bias of the spring 107. Then, the pin-like projection 84 is accommodated into the receiving portion 105, and immediately thereafter, the tip end portion 108a of the stopper 108 closes up the entrance of the receiving portion 105 to hold the pin-like projection 84. The pin-like projection 84 is held by the receiving portion 105 and can hold the drawer 82 at the fully closed position.

Figure 8:
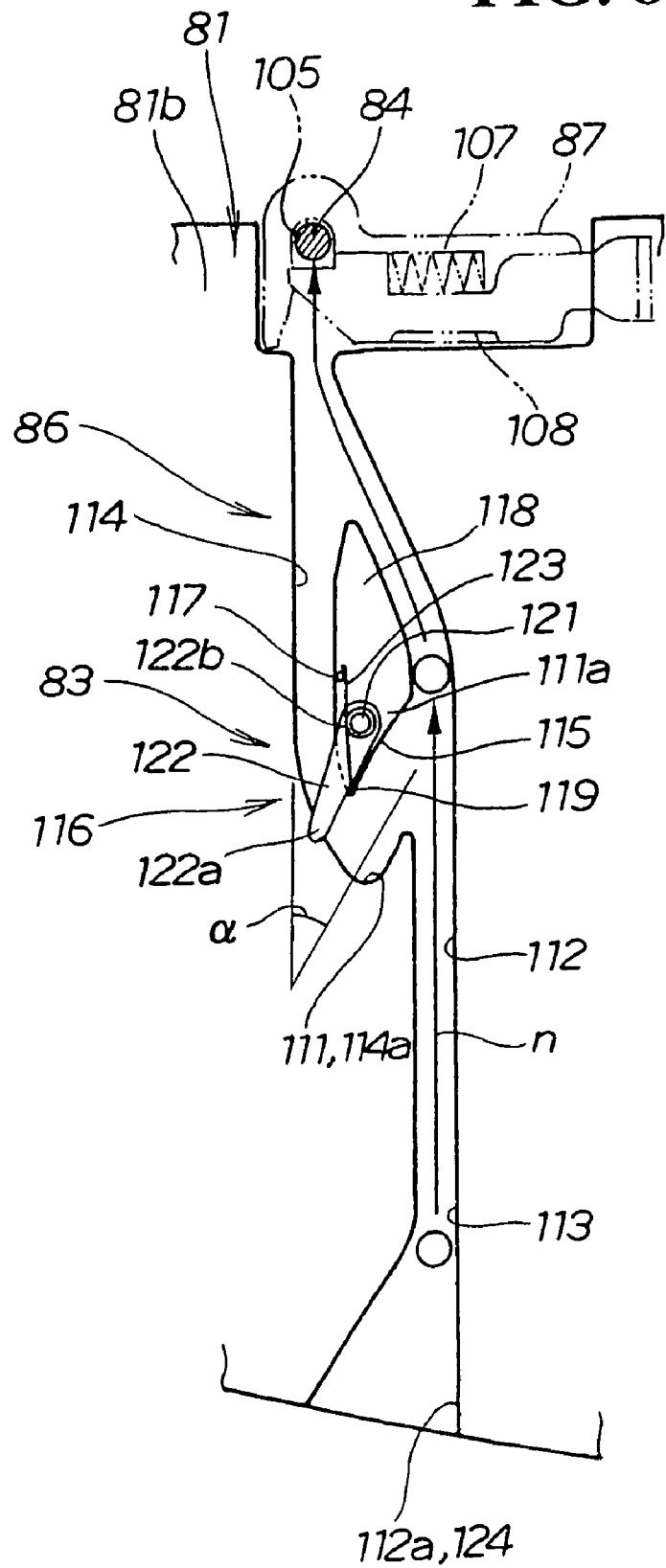
FIG. 8 is a view showing a configuration of an intermediately open stopping mechanism including a groove group according to the present invention and illustrating operation of the intermediately open stopping mechanism (when the drawer is moved from the fully open position to the fully closed position)

FIG. 8 is a view showing a configuration of the intermediately open stopping mechanism including the groove group according to the present invention and illustrating operation of the intermediately open stopping mechanism (when the drawer is moved from the fully open position to the fully closed position).

When the drawer (reference numeral 82 in FIG. 5) is at the intermediately open position, the pin-like projection 84 is positioned at a blind alley portion 111, but when the drawer 82 is at the fully open position, the pin-like projection 84 is positioned at an open end portion 113 of a first guide groove 112.

The intermediately open stopping mechanism 83 includes a groove group 86, which extends in the sliding direction of the drawer 82, on the bottom plate 81b of the accommodation case 81. The groove group 86 guides the pin-like projection 84 provided on the drawer 82.

The groove group 86 provided on the accommodation case 81 includes: a first guide groove 112 for guiding the pin-like projection 84 when the drawer 82 is closed from the fully open position to the fully closed position; a second guide groove 114 operable to guide the pin-like projection 84 provided on the arm member (reference numeral 85 in FIG. 6) when the drawer 82 is opened from the fully closed position to the intermediately open position and having a blind alley portion 111 with which the pin-like projection 84 abuts at the intermediately open position; and a communicating groove 115 for interconnecting the second guide groove and the first guide groove 112 to guide the pin-like projection 84.

The communicating groove 115 is connected to the blind alley portion 111 so as to make an acute angle ($0<\alpha<90°$) in a direction in which the drawer 82 slidably moves and has, at an entrance 111a of the blind alley portion 111, a non-return mechanism 116 which permits, when the drawer 82 moves from the fully closed position to the intermediately open position, the pin-like projection 84 to pass therethrough to the blind alley portion 111 but constrains, when the drawer 82 moves from the intermediately open position to the fully closed position, the pin-like projection 84 to pass therethrough to the communicating groove 115.

The non-return mechanism 116 is described in detail. The blind alley portion 111 is formed in a V-shape as viewed in plan, and a portion surrounded by the first guide groove 112, second guide groove 114 and communicating groove 115 is formed as a triangular portion 118. A shaft member 121 is provided uprightly in the proximity of a vertex 119 of the triangular portion 118 which faces the blind alley portion 111. A non-return arm 122 is fitted at a rear end 122b thereof for pivotal motion around the shaft member 121. Furthermore, the non-return arm 122 is attached at a front end 122a thereof for swinging movement around the shaft member 121. Furthermore, a spring 123 is interposed between the non-return arm 122 and a retaining member 117 provided uprightly at the triangular portion 118 such that the non-return arm 122 is normally disposed so as to cross the second guide groove 114, but when the pin-like projection 84 passes through the second guide groove 114, the non-return arm 122 is biased by the pin-like projection 84 to open the second guide groove 114.

The groove group 86 includes: a first guide groove 112 for guiding the pin-like projection 84 from the fully open position to the fully closed position of the drawer (reference numeral 82 in FIG. 5); a second guide groove 114 extending substantially linearly from the start point at the fully closed position separately from the first guide groove 112 for guiding the pin-like projection 84 from the fully closed position to the intermediately open position of the drawer 82; a blind alley portion 111 provided at an end portion of the second guide groove 114 for stopping the pin-like projection 84 at the intermediately open position; and a communicating groove 115 extending in an inclined relationship from the blind alley portion 111 toward the fully closed position side and intersecting with a mid portion of the first guide groove 112. Furthermore, a non-return mechanism 116 which permits the pin-like projection 84, which advances from the fully closed position to the intermediately open position along the second guide groove 114, to pass therethrough but prevents the pin-like projection 84 to return to the fully closed position therethrough is provided at the entrance of the blind alley portion 111.

Furthermore, at an end portion 112a of the first guide groove 112, an open end 124, extends to and is open at an end portion 81a of the accommodation case 81. The open end 124 is formed in a shape of a spread fan.

The end portion 112a of the first guide groove 112 has the open end 124, which extends to and is open at the end portion 81a of the accommodation case 81. Therefore, the arm member 85 having the pin-like projection 84 can be fitted readily into the first guide groove 112. Accordingly, the drawer 82 can be assembled to the accommodation case 81 readily.

Figure 9:
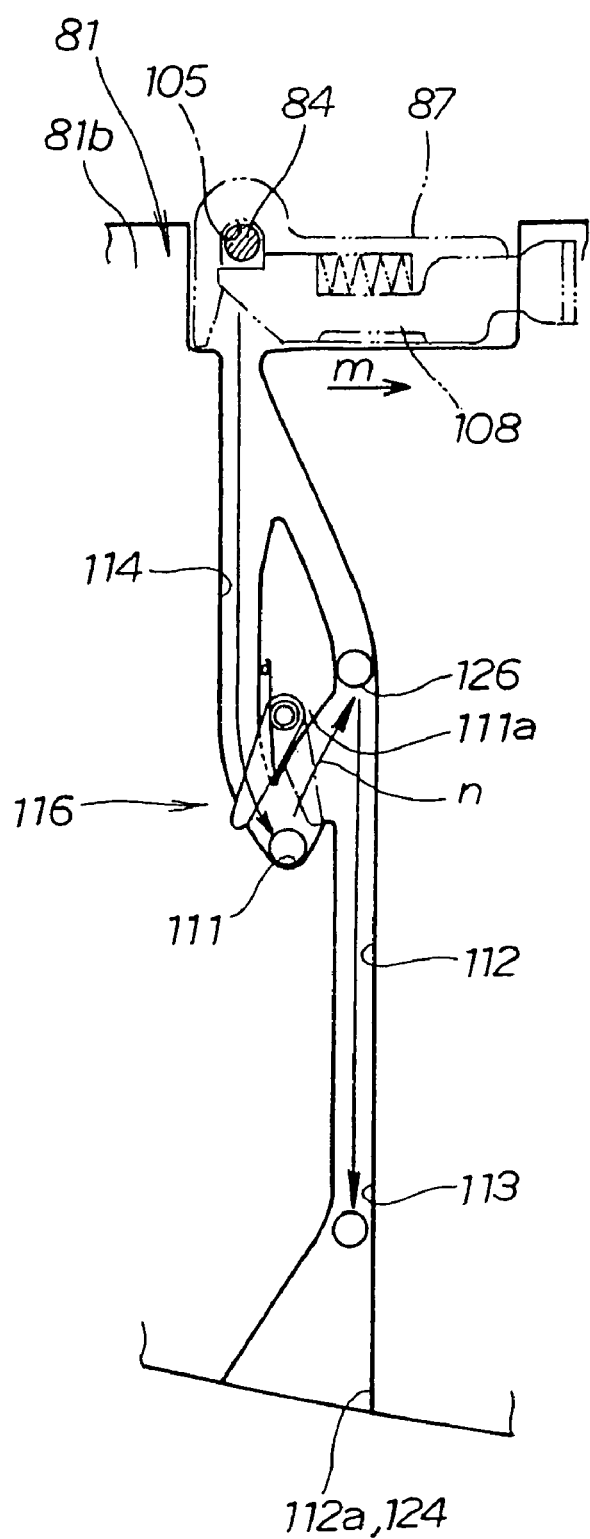
FIG. 9 is a view showing a configuration and operation of the intermediately open stopping mechanism according to the present invention (when the drawer is positioned at an intermediately open position and is moved from the intermediate position to the fully open position)

FIG. 9 is a view showing a configuration and operation of the intermediately open stopping mechanism according to the present invention (when the drawer is placed at the intermediately open position and then moved from the intermediately open position to the fully open position).

When the drawer (reference numeral 82 in FIG. 5) is moved from the fully closed position to the intermediately open position, if the stopper 108 of the locking mechanism 87 is moved in the direction indicated by an arrow mark m to release the pin-like projection 84, then the drawer 82 can be pulled out from the fully closed position to the intermediately open position. As described hereinabove, when the drawer 82 is at the intermediately open position, the pin-like projection 84 is positioned at the blind alley portion 111.

At this time, the non-return mechanism 116 which permits passage of the pin-like projection 84 which moves from the fully closed position to the intermediately open position along the second guide groove 114, but blocks the pin-like projection 84 from returning to the fully closed position, is provided at the entrance 111a of the blind alley portion 111. After the pin-like projection 84 reaches the blind alley portion 111, the pin-like projection 84 does not return into the second guide groove 114. Since the pin-like projection 84 does not return to the second guide groove 114 at all, the drawer (reference numeral 82 in FIG. 5) can be held at the intermediately open position.

If the drawer (reference numeral 82 in FIG. 5) is opened from the intermediately open position to the fully open position, then the pin-like projection 84 stopped at the blind alley portion 111 advances, when the drawer 82 is returned a little, in the direction indicated by an arrow mark n along the communicating groove 115 and comes to a switchover point 126 which is the connection point between the communicating groove 115 and the first guide groove 112. Thereafter, the pin-like projection 84 enters the first guide groove 112. Then, when the drawer 82 is pulled finally, the pin-like projection 84 advances along the first guide groove 112, and the drawer 82 can be pulled out to the fully open position. In short, the driver can move the drawer 82 from the half open position to the fully open position only by pushing and pulling the drawer 82.

Accordingly, the driver can perform operation for opening the drawer 82, which is at the intermediately open position, to the fully open position very readily. Since the drawer 82 can be opened from the intermediately open position to the fully open position only by pushing and pulling operation, the drawer opening operation does not become cumbersome depending upon the physical features of the driver.

Referring back to FIG. 8, when the drawer (reference numeral 82 in FIG. 5) is closed, the pin-like projection 84 moves in the direction indicated by the arrow mark n from the open end portion 113 of the first guide groove 112. Then, when the pin-like projection 84 reaches the receiving portion 105 of the locking mechanism 87, the pin-like projection 84 is held at the receiving portion 105 by the stopper 108, and the drawer 82 is held at the fully closed position.

In short, as the pin-like projection 84 advances along the first guide groove 112, it comes to the fully closed position from the fully open position.

FIG. 10 is a perspective view illustrating that the drawer is at the intermediately open position or the fully open position.

Figure 10A:
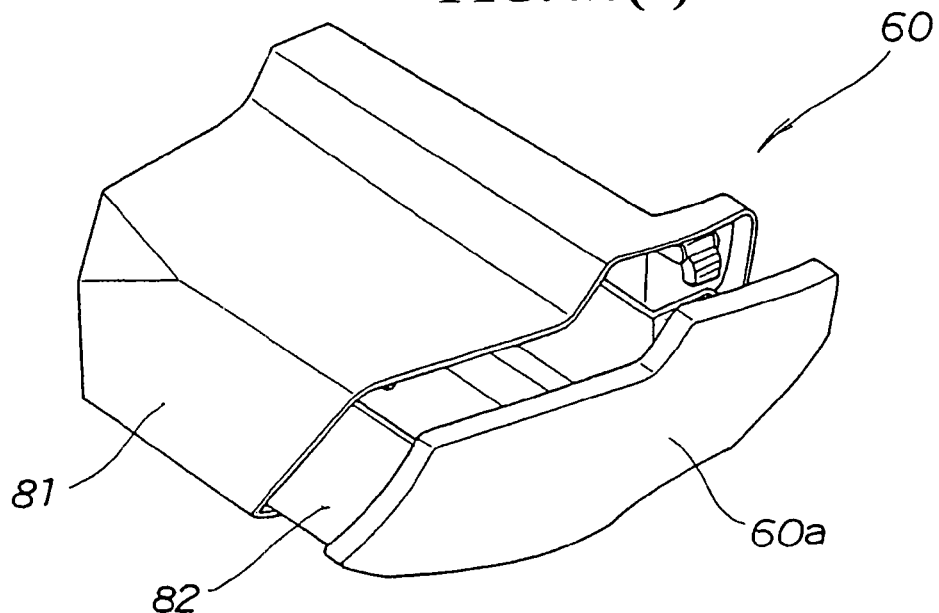
FIGS. 10(a) and 10(b) are perspective view illustrating that the drawer is at the intermediately open position or the fully open position.
Figure 10B:
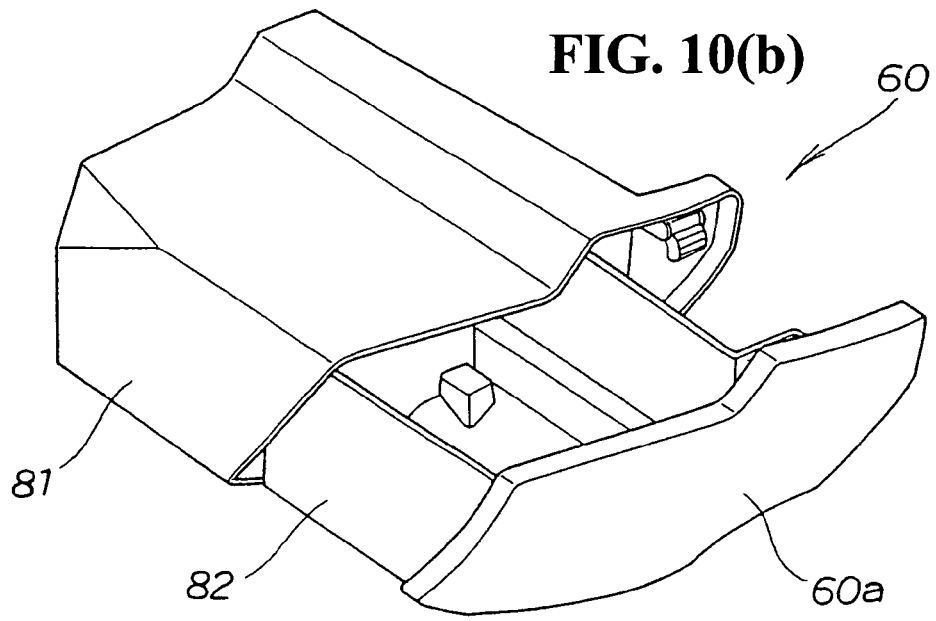

FIG. 10(a) indicates that the drawer 82 is positioned at the intermediately open position and illustrates a state wherein the pin-like projection (reference numeral 84 in FIG. 9) abuts with the blind alley portion 111 provided in the second guide groove 114. FIG. 10(b) indicates that the drawer 82 is positioned at the fully open position and illustrates another state wherein the pin-like projection 84 is positioned at the open end portion 113 of the first guide groove 112.

In order to move the drawer 82 from the intermediately open position (intermediately open stopping position) to the fully open position, it is only necessary for the driver to push and pull the drawer 82. Accordingly, the operation for opening the drawer 82 at the intermediately open position to the fully open position can be performed very easily.

The driver can move the drawer 82 to the fully open position only by gripping the lid 60a to push and pull the drawer 82. Accordingly, the driver can perform the operation for opening the drawer 82 at the intermediately open position to the fully open position very easily. Furthermore, since the intermediately open stopping mechanism 83 has a simple configuration including the groove group 86 and the arm member 85 which has the pin-like projection 84, assembly of the drawer 82 to the accommodation case 81 can be performed very easily. Furthermore, since the intermediately open stopping mechanism 83 has a simple configuration, maintenance of the arm member 85 is also easy.

Figure 11:
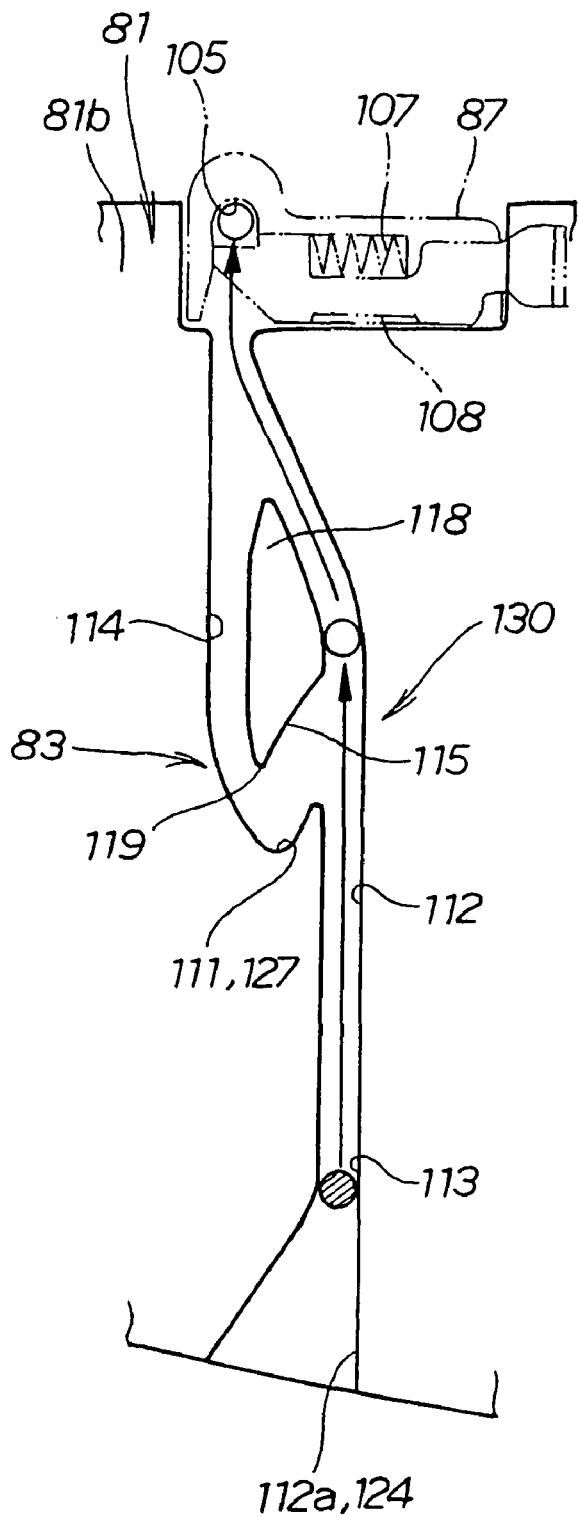
FIG. 11 is a view of an embodiment different from that in FIG. 8.

FIG. 11 is a view of an embodiment different from that of FIG. 8, and the major difference resides in elimination of the non-return mechanism 116.

The blind alley portion 111 is formed in a V-shape as viewed in plan, and a portion surrounded by the first guide groove 112, second guide groove 114 and communicating groove 115 is formed as the triangular portion 118. Furthermore, the blind alley portion 111 is defined such that the V-shape bottom 127 of the blind alley portion 111 is positioned rather near to the first guide groove 112 with respect to the vertex 119 of the triangular portion 118 which faces the blind alley portion 111.

Figure 12:
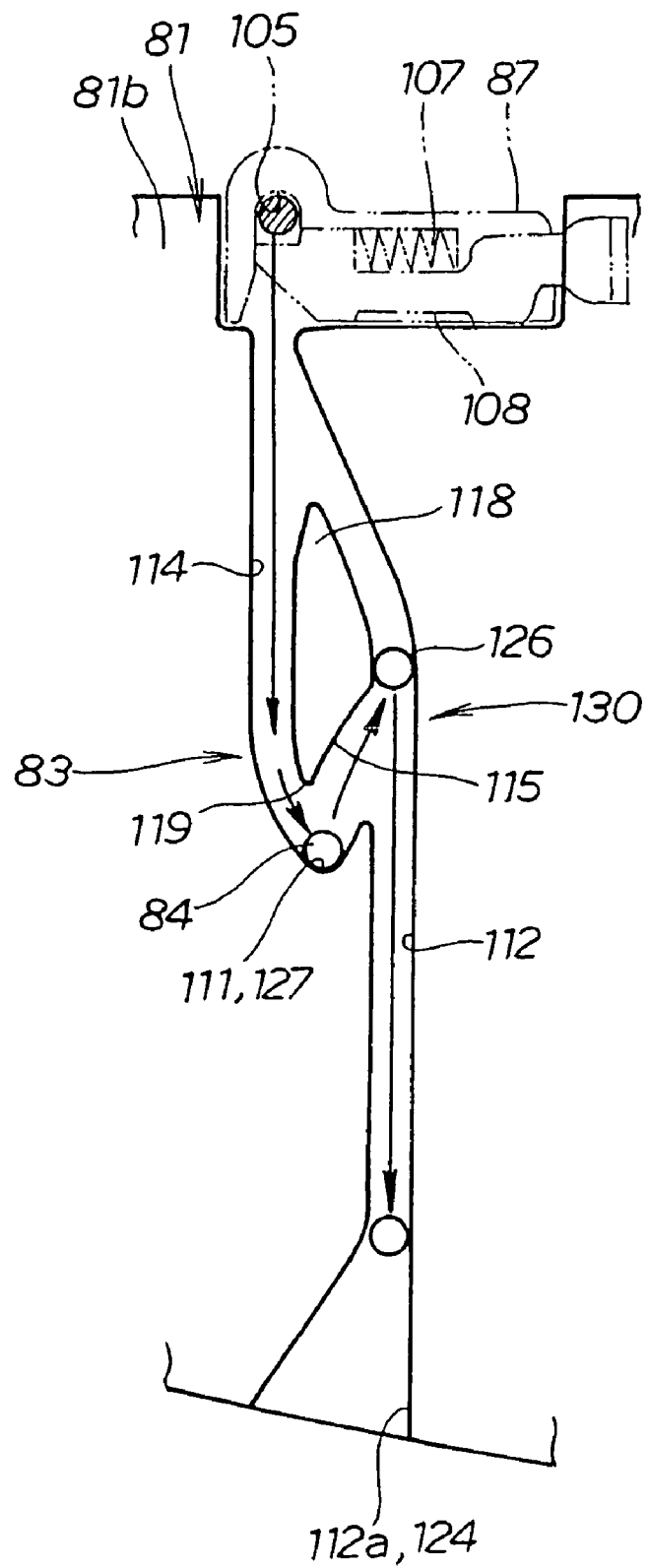
FIG. 12 is a view of an embodiment different from that in FIG. 9.

FIG. 12 is a view of an embodiment different from that of FIG. 9. A resilient mechanism (reference numeral 93 in FIG. 5) for resiliently biasing the drawer (reference numeral 82 in FIG. 5) at the fully closed position toward the opening side to the fully open position and a stopping cancel mechanism 130 which includes a communicating groove 115 for canceling the stopping by the intermediately open stopping mechanism 83 if the drawer 82 stopped at the intermediately open position is operated in the closing direction by the intermediately open stopping mechanism 83 are provided on the accommodation case (reference numeral 81 in FIG. 5). The drawer 82 is stopped at the fully open position after it is operated in the closing direction and the stopping by the intermediately open stopping mechanism 83 is canceled.

Since the resilient mechanism (reference numeral 93 in FIG. 5) for resiliently biasing the drawer 82 to the opening side is provided on the drawer 82, the pin-like projection 84 abuts with the blind alley portion 111 at the intermediately open position and is biased toward the blind alley portion 111.

The blind alley portion 111 is formed in a V-shape as viewed in plan, and a portion surrounded by the first guide groove 112, second guide groove 114 and communicating groove 115 is formed as the triangular portion 118. Furthermore, the blind alley portion 111 is defined such that the V-shape bottom 127 of the blind alley portion 111 is positioned rather near to the first guide groove 112 with respect to the vertex 119 of the triangular portion 118 which faces the blind alley portion 111. Therefore, the pin-like projection 84 entering the blind alley portion 111 moves into the communicating groove 115 when the drawer 82 is returned a little and comes to the switchover point 126 connecting to the first guide groove 112.

Since the resilient mechanism 93 for resiliently biasing the drawer 82 toward the opening side is provided on the drawer 82 and the blind alley portion 111 is defined such that the V-shape bottom 127 of the blind alley portion 111 is positioned rather near to the first guide groove 112, when the drawer 82 is moved from the intermediately open position to the fully open position, the pin-like projection 84 moves into the communicating groove 115 and can finally enter the first guide groove 112. Accordingly, the drawer 82 can be opened to the fully open position.

Since the blind alley portion 111 is defined such that the V-shape bottom 127 of the blind alley portion 111 is positioned rather near to the first guide groove 112, the non-return mechanism 116 provided at the entrance 111a of the blind alley portion 111 is not required any more. Since the requirement for the non-return mechanism 116 is eliminated, the structure of the intermediately open stopping mechanism 83 can be simplified.

It is to be noted that, while the present invention is applied, in the embodiments, to a motorcycle, it can be applied also to four-wheeled vehicles and may be applied to general vehicles.

In the present invention, the non-return mechanism to be provided at the entrance of the blind alley portion may be omitted. Furthermore, the resilient mechanism for resiliently biasing the drawer to the opening side may be omitted on the accommodation case.

Furthermore, the end portion of the second guide groove or the open end provided at the end portion of the first guide groove may be formed as an open end having an equal groove width without being formed in a shape of a spread fan.

The present invention can be applied suitably to an accommodation box of a motorcycle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A container equipped on a vehicle, comprising:
    a drawer for accommodating a small article;
    an accommodation case for accommodating said drawer for sliding movement;
    an intermediately open stopping mechanism for stopping said drawer at an intermediately open position when said drawer is pulled out from a closed position toward a fully open position;
    a resilient mechanism provided on said accommodation case for resiliently biasing said drawer at a fully closed position toward the fully open position until the fully open position is reached; and
    a stopping cancel mechanism provided on said accommodation case for canceling the stopping by said intermediately open stopping mechanism by first operating the drawer in the closing direction,
    wherein said drawer can be opened to the fully open position after said drawer is operated in the closing direction from the intermediately open position and the stopping by said intermediately open stopping mechanism is canceled by the stopping cancel mechanism,
    wherein said intermediately open stopping mechanism includes:
    an arm member provided for horizontal pivotal motion on said drawer or said accommodation case and having a pin-like projection at a tip end thereof; and
    a groove group extending in the sliding direction of said drawer on said accommodation case or said drawer for guiding said pin-like projection, said groove group includes:
    a first guide groove for guiding said pin-like projection from the fully open position to the fully closed position of said drawer;
    a second guide groove extending substantially linearly from a start point thereof at the fully closed position separately from said first guide groove for guiding said pin-like projection from the fully closed position to the intermediately open position of said drawer;
    a blind alley portion provided at an end portion of said second guide groove for stopping said pin-like projection at the intermediately open position; and
    a communicating groove extending in an inclined relationship from said blind alley portion to the fully closed position side and intersecting with a mid portion of said first guide groove,
    wherein when said drawer is opened, as said pin-like projection advances along said second guide groove extending linearly, said pin-like projection is stopped at said blind alley portion, and then, as said drawer is returned slightly, said pin-like projection advances along said communicating path and enters said first guide groove, then, as said drawer is pulled out, said pin-like projection advances along said first guide groove and comes to the fully open position, but when said drawer is closed, as said pin-like projection advances along said first guide groove, said pin-like projection moves from the fully open position to the fully closed position.

2. The container equipped on a vehicle according to claim 1, further comprising a non-return mechanism provided at an entrance of said blind alley portion, said non-return mechanism allowing passage of said pin-like projection from the fully closed position to the intermediately open position along said second guide groove, but preventing said pin-like projection from returning to the fully closed position.

3. The container equipped on a vehicle according to claim 2, said blind alley portion is formed in a V-shape as viewed in plan and a portion surrounded by said first guide groove, said second guide groove and said communicating groove is formed as a triangular portion, and said blind alley portion is defined such that the bottom of the V-shape of said blind alley portion is positioned rather near to said first guide groove with respect to the vertex of said triangular portion that faces said blind alley portion.

4. The container equipped on a vehicle according to claim 2, wherein said groove group is provided on said accommodation case and said arm member is provided on said drawer.

5. The container equipped on a vehicle according to claim 2, wherein an end portion of said second guide groove or an end portion of said first guide groove has an open end that extends to and is open at an end portion of said accommodation case, and said open end is formed in a shape of a spread fan.

6. The container equipped on a vehicle according to claim 1, said blind alley portion is formed in a V-shape as viewed in plan and a portion surrounded by said first guide groove, said second guide groove and said communicating groove is formed as a triangular portion, and said blind alley portion is defined such that the bottom of the V-shape of said blind alley portion is positioned rather near to said first guide groove with respect to the vertex of said triangular portion that faces said blind alley portion.

7. The container equipped on a vehicle according to claim 6, wherein said groove group is provided on said accommodation case and said arm member is provided on said drawer.

8. The container equipped on a vehicle according to claim 1, wherein said groove group is provided on said accommodation case and said arm member is provided on said drawer.

9. The container equipped on a vehicle according to claim 1, wherein an end portion of said second guide groove or an end portion of said first guide groove has an open end that extends to and is open at an end portion of said accommodation case, and said open end is formed in a shape of a spread fan.

10. A container equipped on a vehicle, comprising:
a drawer;
an accommodation case that supports said drawer for sliding movement;
a stopping mechanism that stops said drawer at an intermediately open position when said drawer is pulled out from a fully closed position toward a fully open position; and
a cancel mechanism that cancels the operation of the stopping mechanism when the drawer is stopped at the intermediately open position by said stopping mechanism and is operated slightly toward the fully closed position, so that the drawer can be opened to the fully open position,
wherein said stopping mechanism includes:
an arm member provided for horizontal pivotal motion on said drawer or said accommodation case and having a pin-like projection at a tip end thereof; and
a groove group extending in the sliding direction of said drawer on said accommodation case or said drawer for guiding said pin-like projection, said groove group includes:
a first guide groove for guiding said pin-like projection from the fully open position to the fully closed position of said drawer; a second guide groove extending substantially linearly from a start point thereof at the fully closed position separately from said first guide groove for guiding said pin-like projection from the fully closed position to the intermediately open position of said drawer;
a blind alley portion provided at an end portion of said second guide groove for stopping said pin-like projection at the intermediately open position; and
a communicating groove extending in an inclined relationship from said blind alley portion to the fully closed position side and intersecting with a mid portion of said first guide groove,
wherein when said drawer is opened, as said pin-like projection advances along said second guide groove extending linearly, said pin-like projection is stopped at said blind alley portion, and then, as said drawer is returned slightly, said pin-like projection advances along said communicating path and enters said first guide groove, then, as said drawer is pulled out, said pin-like projection advances along said first guide groove and comes to the fully open position, but when said drawer is closed, as said pin-like projection advances along said first guide groove, said pin-like projection moves from the fully open position to the fully closed position.

11. The container equipped on a vehicle according to claim 10, further comprising a non-return mechanism provided at an entrance of said blind alley portion, said non-return mechanism allowing passage of said pin-like projection from the fully closed position to the intermediately open position along said second guide groove, but preventing said pin-like projection from returning to the fully closed position.

12. The container equipped on a vehicle according to claim 11, said blind alley portion is formed in a V-shape as viewed in plan and a portion surrounded by said first guide groove, said second guide groove and said communicating groove is formed as a triangular portion, and said blind alley portion is defined such that the bottom of the V-shape of said blind alley portion is positioned rather near to said first guide groove with respect to the vertex of said triangular portion that faces said blind alley portion.

13. The container equipped on a vehicle according to claim 11, wherein said groove group is provided on said accommodation case and said arm member is provided on said drawer.

14. The container equipped on a vehicle according to claim 11, wherein an end portion of said second guide groove or an end portion of said first guide groove has an open end that extends to and is open at an end portion of said accommodation case, and said open end is formed in a shape of a spread fan.

15. The container equipped on a vehicle according to claim 10, said blind alley portion is formed in a V-shape as viewed in plan and a portion surrounded by said first guide groove, said second guide groove and said communicating groove is formed as a triangular portion, and said blind alley portion is defined such that the bottom of the V-shape of said blind alley portion is positioned rather near to said first guide groove with respect to the vertex of said triangular portion that faces said blind alley portion.

16. The container equipped on a vehicle according to claim 15, wherein said groove group is provided on said accommodation case and said arm member is provided on said drawer.

17. The container equipped on a vehicle according to claim 10, wherein said groove group is provided on said accommodation case and said arm member is provided on said drawer.

18. The container equipped on a vehicle according to claim 10, wherein an end portion of said second guide groove or an end portion of said first guide groove has an open end that extends to and is open at an end portion of said accommodation case, and said open end is formed in a shape of a spread fan.

* * * * *